United States Patent [19]
Kester et al.

[11] Patent Number: 4,466,308
[45] Date of Patent: Aug. 21, 1984

[54] CONTROL ASSEMBLY FOR LAWNMOWER HAVING ELECTRICALLY STARTED ENGINE

[75] Inventors: Bruce J. Kester; Arthur L. Urban; Dale C. Kester, all of Wichita, Kans.

[73] Assignee: Conchemco, Incorporated, Lenexa, Kans.

[21] Appl. No.: 388,898

[22] Filed: Jun. 16, 1982

[51] Int. Cl.³ .................... G05G 11/00; A01D 75/28; B60K 41/20
[52] U.S. Cl. .................... 74/483 R; 56/10.5; 192/1
[58] Field of Search ............. 56/10.5; 74/483 R, 501; 192/35, 0.082, 0.07, 0.072, 0.058, 1, 2, 3 M; 180/19.3, 19.1

[56] References Cited
U.S. PATENT DOCUMENTS

| | | |
|---|---|---|
| 3,942,604 | 3/1976 | Black .................................. 180/19.3 |
| 4,167,221 | 9/1979 | Edmonson et al. ................ 180/19.3 |
| 4,212,363 | 7/1980 | Letner et al. ....................... 180/19.3 |
| 4,230,200 | 10/1980 | Carolan ............................. 180/19.3 |
| 4,394,893 | 7/1983 | Kronich et al. ..................... 192/35 |

Primary Examiner—Leslie A. Braun
Assistant Examiner—Michael J. Gonet
Attorney, Agent, or Firm—Schmidt, Johnson, Hovey & Williams

[57] ABSTRACT

A compact, safety, control assembly for lawnmowers having electrically started engines is provided which includes a "dead man" function and which requires two distinct steps for starting the lawnmower engine. The control assembly preferably includes a shiftable handle, a moveable lever, a cable connected to the lawnmower ignition assembly and shiftable between positions corresponding to the off, on and start position of the ignition assembly, a spring biasing the cable to the off position, a rotatable operating mechanism connected to the cable and engageable by the handle and lever, and a guide and slot assembly that enables shifting of the cable to the start position from the off position only after completion of a two-handed, two-step operation. In operation, the operating mechanism is rotated by the operation of the handle, thereby shifting the cable into the on position. The operating mechanism and the cable may be shifted to the start position, once the operating mechanism and cable have been rotated to the on position, by manual operation of the lever. The biasing spring returns the cable and operating mechanism to the on position when the lever is released, where they are retained by the handle. Upon release of the handle, the operating mechanism and cable shift to the off position under the influence of the biasing spring, and the lawnmower engine is shut down.

7 Claims, 7 Drawing Figures

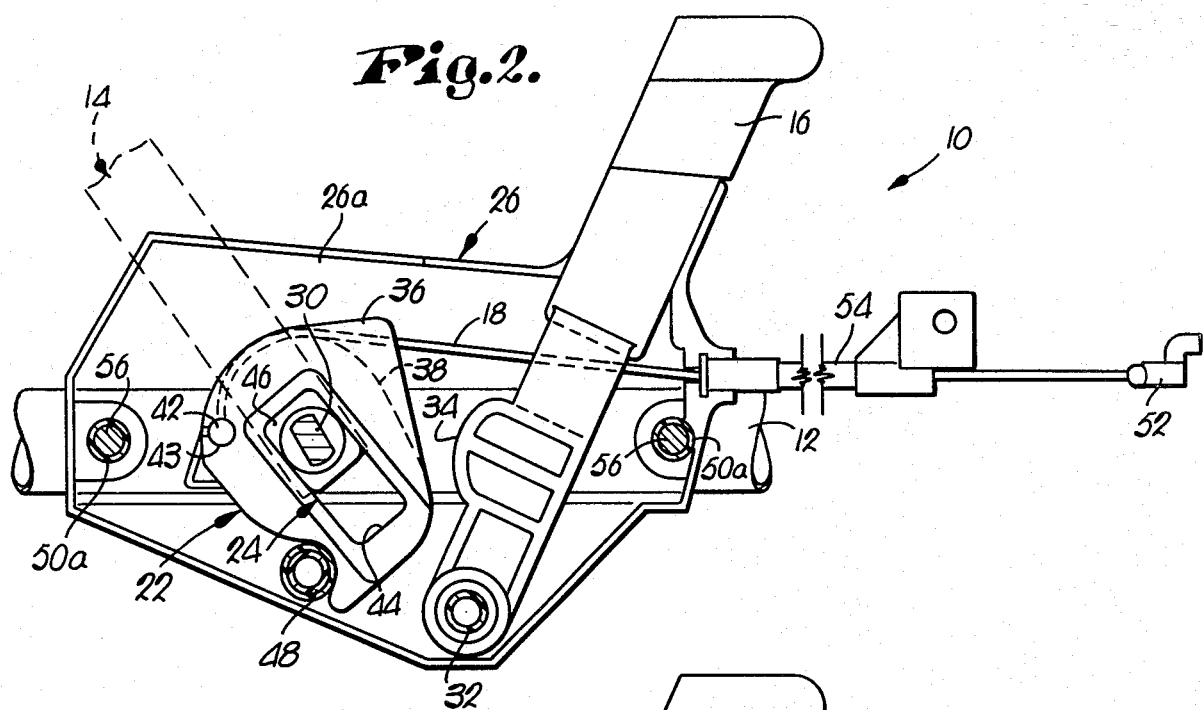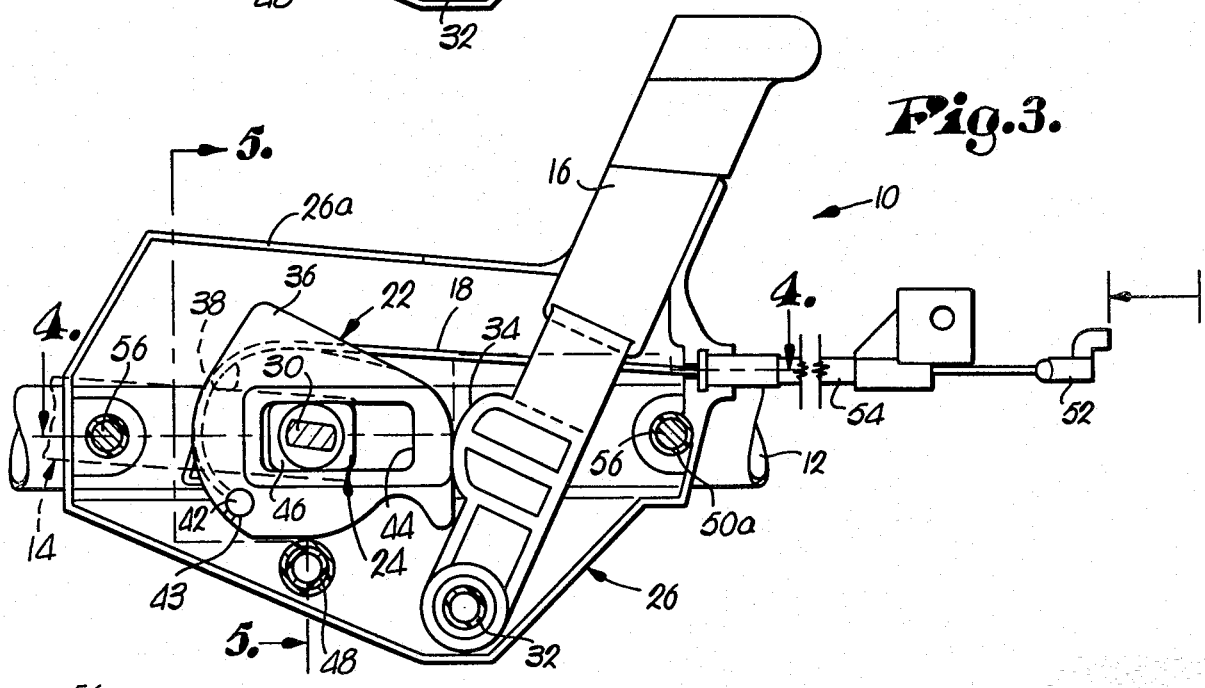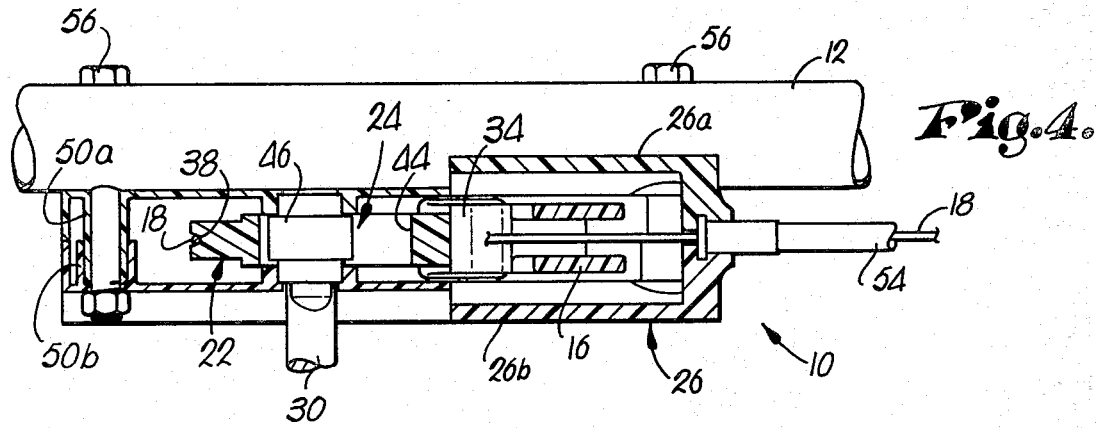

CONTROL ASSEMBLY FOR LAWNMOWER HAVING ELECTRICALLY STARTED ENGINE

BACKGROUND OF THE INVENTION

1. Field of the Invention

The present invention is concerned with an improved control assembly for lawnmowers having electrically started engines. More particularly, it is concerned with such a control apparatus which provides a desirable "dead man" function, along with a two step procedure for starting the engine.

2. Description of the Prior Art

Powered lawnmowers having electrically started engines are well known and in wide spread use. Generally speaking, such mowers are often of the walk-behind rotary type and include a lowermost housing supported on spaced wheels, and a gasoline powered engine coupled to a rotary mower blade disposed within the housing. An elongated handle is affixed to the housing at the rear thereof, so that the user operates the mower while walking behind the engine and supporting housing.

In recent years the goverment has promulgated a number of safety regulations relating to mowers of the type described. For example, such mowers must now be equipped with a so called "dead man" switch which generally includes a spring-biased handle which is grasped by the operator during normal operation of the mower. The mowing action is rapidly terminated, when the handle is released, making it impossible to leave the mower running while unattended.

In addition, it has been proposed that electrically started power mowers be provided with a control assembly requiring two distinct actions for starting the mower once it has ceased operation.

In view of the beforementioned regulations, there is a need for a low cost, compact, reliable, and easy to use control apparatus which includes a "dead man" function and an operating mechanism requiring two distinct steps for starting the lawnmower engine.

SUMMARY OF THE INVENTION

The present invention relates to a remote control starting assembly for power lawnmowers which satisfies all presently existing and proposed safety standards. Broadly speaking, the assembly hereof includes a shiftable handle, a movable lever, a cable connected to the lawnmower ignition assembly and shiftable between positions corresponding to the off, on and start position of the engine ignition assembly, and a spring biasing the cable to the off position. The cable is connected to a rotatable operating mechanism that is engageable by the handle and lever. A guide and slot assembly enables rotation of the mechanism, and consequent shifting of the cable, to the start position from the off position only after completion of a two-handed, two-step operation of the handle and lever.

In particularly preferred forms, the shiftable handle includes an attachment for grasping by the operator, and the operating mechanism is aligned in the off position by a fixed stop when the handle is released.

BRIEF DESCRIPTION OF THE DRAWINGS

FIG. 2 is a vertical, sectional view of the control apparatus, with the cable and operating mechanism in the off position, phantom lines depicting the handle means;

FIG. 3 is similar to FIG. 2 but with the cable and operating mechanism in the on position;

FIG. 4 is a sectional view taken along the line 4—4 of FIG. 3;

DESCRIPTION OF THE PREFERRED EMBODIMENT

Figure 1:
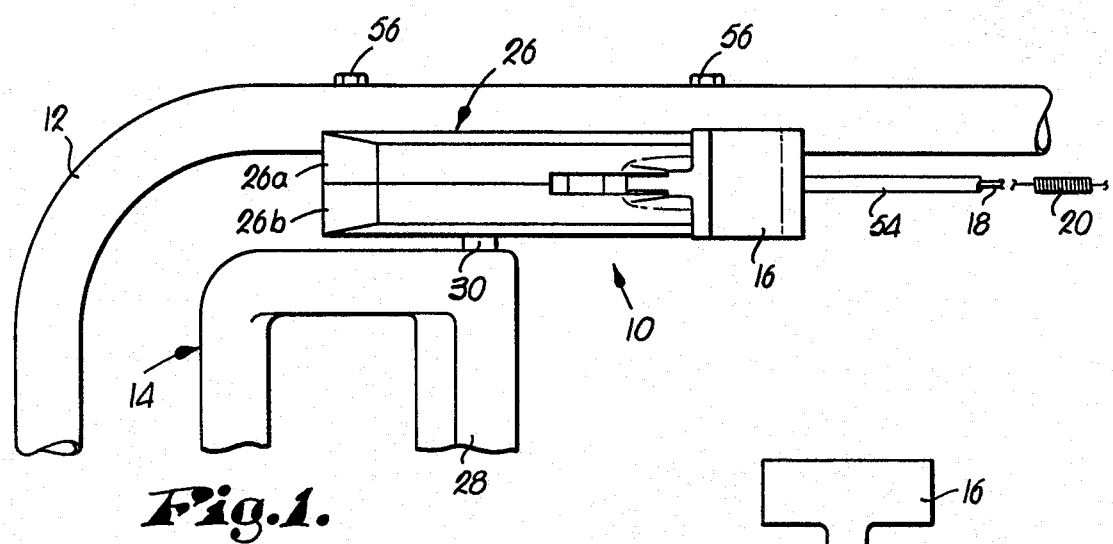
FIG. 1 is a fragmentary perspective view depicting the control apparatus of the present invention operatively mounted on the main handle of a powered lawnmower.
Figure 7:
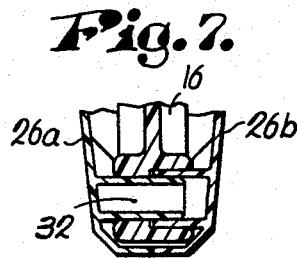
FIG. 7 is a fragmentary, sectional view taken along the line 7—7 of FIG. 6.

Turning now to the drawings, a control assembly 10 is depicted in FIG. 1 as it would appear when operatively mounted on the U-shaped main handle 12 of a powered lawnmower. The assembly 10 broadly includes a shiftable handle 14, a moveable operating means or lever 16, a cable 18, a cable biasing spring 20, an operating structure 22, and an operating mechanism mounting guide and slot assembly 24. The control assembly is mounted within a synthetic resin housing 26.

In more detail, the handle 14 includes a synthetic resin, hand graspable portion 28 and a metallic connecting rod 30. The moveable operating lever 16 is an elongated structure. One end of the lever 16 is pivotally mounted to an internal projection 32 within assembly housing 26. Lever 16 includes an operating mechanism engaging abutment 34.

The operating mechanism 22 is an irregularly shaped structure pivotally mounted within the housing 26 by the guide and slot assembly 24. A portion of the edge of the operating mechanism includes a pair of spaced apart, opposed flanges 36 which cooperatively define a cable-receiving groove 38. A pair of opposed, inwardly projecting nibs 40 are molded to flanges 36 and releasably retain cable 18 within the groove 38. Cable 18 is anchored at one end thereof to rivet 42. Rivet 42 is removably and pivotally received within a retaining channel 43 in the edge of operating mechanism 22.

The guide and slot assembly 24 includes a generally rectangular slot 44 generally centered within operating mechanism 22, and a generally rectangular guide 46 shiftably received within slot 44. The guide 46 is fixedly positioned on rod 30 of assembly handle 14 for rotation therewith, and is pivotally mounted within housing 26.

Figure 5:
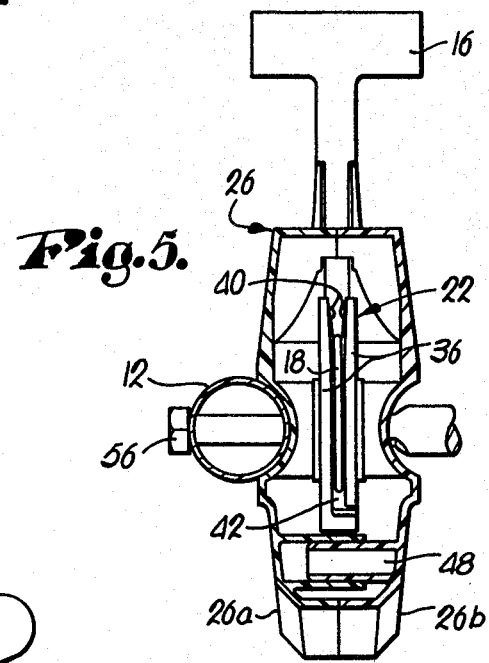
FIG. 5 is a sectional view taken along 5—5 of FIG. 3.

An operating mechanism engaging stop 48 is fixedly attached within the housing 26. As best depicted in FIGS. 4 and 5, housing 26 comprises two separate, generally symmetrical pieces 26a, 26b. Each housing piece 26a, 26b includes a pair of inwardly projecting, tubular supports 50a, 50b. The outer diameters of supports 50a associated with housing piece 26a are equal to the inner diameters of supports 50b associated with housing piece 26. As depicted in FIG. 4, supports 50a are telescopically received within the supports 50b. In this regard, it will be appreciated that projection 32 and stop 48 likewise include sections associated with each housing piece 26a, 26b that are telescopically received one within the other.

Cable 18 extends between the housing 26 and the mower ignition assembly (not shown), and terminates in fitting 52 at the point of juncture between the cable 18 and the ignition assembly. The cable 18 is received within sheath 54 at points external to housing 26.

Housing 26 is fixedly secured to the power lawnmower handle 12 by a pair of nut and bolt assemblies 56. Assemblies 56 are received through housing 26 via supports 50.

Figure 6:
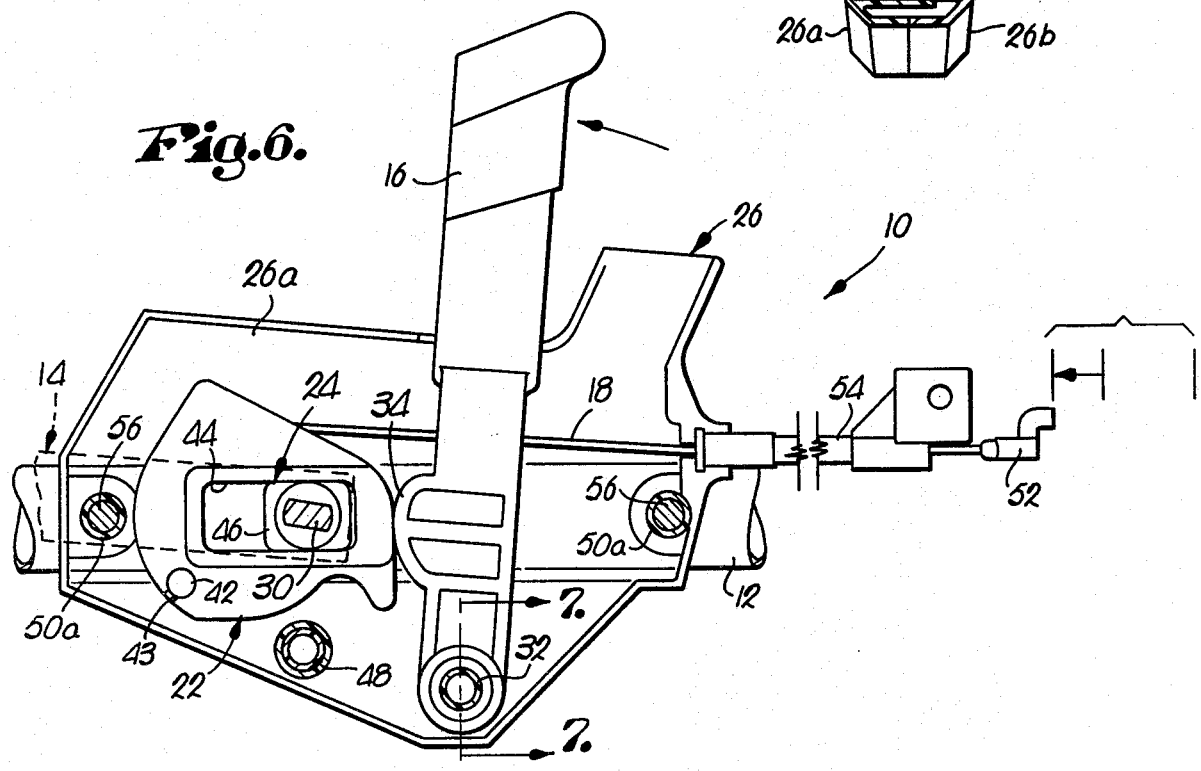
FIG. 6 is a vertical sectional view of the control apparatus, with the operating mechanism and cable in the start position.

The operation of control assembly 10 will now be described, and particularly with reference to FIGS. 2, 3 and 6 which collectively illustrate an operational sequence.

Referring first to FIG. 2, assembly 10 is shown in a configuration wherein the lawnmower ignition assembly is in the off position, and the lawnmower engine is off. In this configuration it will be observed that the operating structure 22 is rotated clockwise, as seen from the perspective of FIG. 2, and abuts the stop 48. The first step in initiating the ignition assembly involves shifting the handle 14 to a position shown by phantom lines in FIG. 3, wherein the operating mechanism 22 is rotated counterclockwise, and the mechanism 22 and cable 18 are shifted to the on position.

Once the operating mechanism 22 and cable 18 are in the on position, as depicted in FIG. 3, lever 16 may be shifted leftwardly, as seen from the perspective of FIG. 3. Lever abutment 34 engages the operating mechanism 22 and shifts the operating mechanism 22 leftwardly until it reaches the position depicted in FIG. 6. FIG. 6 depicts the operating mechanism 22 and cable 18 in the start position.

Once the operator releases the lever 16, operating mechanism 22 and cable 18 will shift rightwardly under the influence of biasing spring 20. So long as the handle 14 is retained in its depressed position, the operating mechanism 22 and cable 18 will remain in the on position, as depicted in FIG. 3, and the mower engine will operate.

The operating mechanism 22 will rotate clockwise, and the cable 18 will be shifted to the off position, once the handle 14 is released. In this manner, it will be appreciated that the control assembly 10 hereof is provided with a "dead man" function.

We claim:

1. A power lawnmower control apparatus for engaging an electric ignition assembly having off, on and start positions, comprising:

shiftable handle means;
   moveable operating means;
   cable means adapted for operative connection to said ignition assembly and shiftable between positions corresponding to said off, on and start position of said ignition assembly;
   means for biasing said cable to said off position;
   operating mechanism operably coupling said cable, handle means and operating means; and
   means mounting said operating mechanism for first movement thereof and consequent shifting of said cable to said on position thereof, in response to shifting of said handle means, for releasably retaining said cable in said on position while said handle means remains in said shifted position, and for second movement thereof and consequent shifting of said cable to said start position when said cable is in said on position and said mechanism is moveably engaged by said operating means, said mounting means comprising a pivotally mounted, non-circular guide;
   said operating mechanism including structure defining an elongated guide-receiving slot, said guide being engaged by said slot so as to permit shifting of said operating mechanism to said start position when said mechanism is in said on position and to inhibit shifting of said mechanism to said start position when said mechanism is in a position other than said on position.

2. A control apparatus as in claim 1, wherein said mounting means further includes means for restricting the movement of said operating means when said cable is in said off position, thereby inhibiting the shifting of said cable from said off position to said start position until said cable is shifted to said on position in response to shifting of said handle means.

3. A control apparatus as in claim 1, said handle means including structure oriented for grasping by the operator of said lawnmower during cutting operations therewith in order to maintain said cable in said on position.

4. A control apparatus as in claim 1, said operating means including an elongated lever pivotally moveable about one end thereof, and including structure defining an aperture therethrough, said cable being received through said aperture.

5. A control apparatus as in claim 1, said operating means including an elongated lever pivotally moveable about one end thereof, and including an abutment on said lever for moveably engaging said operating mechanism.

6. A control apparatus as in claim 1, said operating mechanism including a pair of opposed, groove-defining flanges along one edge thereof, said cable being received within said groove.

7. A control apparatus as in claim 1, said apparatus including a fixed, operating mechanism engaging stop, said operating mechanism including a stop-receiving edge, said stop and said stop-receiving edge oriented to align said mechanism in said off position when said handle means are released and said operating mechanism and cable are shifted by said biasing means.

* * * * *